(12) United States Patent
Powell et al.

(10) Patent No.: US 10,565,044 B2
(45) Date of Patent: Feb. 18, 2020

(54) MESSAGE HANDLING RELATED TO NON-PARALLELIZABLE FUNCTIONALITY

(71) Applicant: SAP SE, Walldorf (DE)

(72) Inventors: Jeffrey Powell, La Crosse, WI (US); Benjamin Lorenz, Tomah, WI (US)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 15/812,241

(22) Filed: Nov. 14, 2017

(65) Prior Publication Data

US 2019/0146863 A1 May 16, 2019

(51) Int. Cl.
*G06F 11/07* (2006.01)

(52) U.S. Cl.
CPC ...... *G06F 11/0784* (2013.01); *G06F 11/0727* (2013.01); *G06F 11/0751* (2013.01); *G06F 11/0778* (2013.01)

(58) Field of Classification Search
CPC ............. G06F 11/0781; G06F 11/0778; G06F 11/0784; H04L 41/06
See application file for complete search history.

(56) References Cited

U.S. PATENT DOCUMENTS

| | | | |
|---|---|---|---|
| 6,247,149 B1 * | 6/2001 | Falls ................... | G06F 11/0748 714/45 |
| 7,155,514 B1 * | 12/2006 | Milford .................. | H04L 41/06 709/225 |
| 7,484,215 B2 | 1/2009 | Tuel | |
| 7,865,911 B2 | 1/2011 | Lin et al. | |
| 8,055,711 B2 | 11/2011 | Fachan et al. | |
| 8,214,846 B1 * | 7/2012 | Leonard ............... | G06F 11/0709 709/213 |
| 8,407,335 B1 * | 3/2013 | Church ............... | G06F 11/0709 709/218 |
| 8,856,257 B1 * | 10/2014 | Zhang ................. | G06F 11/3006 709/207 |
| 9,465,594 B2 | 10/2016 | Joisha | |
| 9,710,315 B2 | 7/2017 | Kumar et al. | |
| 10,120,746 B1 * | 11/2018 | Sharifi Mehr ........ | G06F 11/079 |
| 2005/0278731 A1 * | 12/2005 | Cameron ............... | H04H 60/66 725/14 |
| 2011/0275364 A1 * | 11/2011 | Austin .................... | H04L 41/06 455/423 |
| 2011/0320884 A1 * | 12/2011 | Thilagar ............. | G06F 11/0709 714/48 |
| 2014/0019984 A1 | 1/2014 | Li et al. | |

(Continued)

*Primary Examiner* — Yolanda L Wilson
(74) *Attorney, Agent, or Firm* — Sterne, Kessler, Goldstein & Fox P.L.L.C.

(57) ABSTRACT

Disclosed herein are system, method, and computer program product embodiments for message handling related to non-parallelizable functionality. An embodiment operates by determining a plurality of diagnostic messages corresponding to processing a request that includes both a first set and a second set of diagnostic messages. Diagnostic information corresponding to the first set of diagnostic messages, from previously processed requests, is determined to be stored in a cache. Diagnostic information corresponding to the second set of diagnostic messages is retrieved from the disk storage. A diagnostic report associated with the processing of the request including diagnostic information from both the first set and the second set of diagnostic messages is generated and returned.

17 Claims, 3 Drawing Sheets

(56) References Cited

U.S. PATENT DOCUMENTS

2014/0075443 A1 3/2014 Tewes
2016/0092251 A1* 3/2016 Wagner ............... G06F 9/45533
 718/1
2017/0351559 A1* 12/2017 Rajagopal ........... G06F 11/0781

* cited by examiner

MESSAGE HANDLING RELATED TO NON-PARALLELIZABLE FUNCTIONALITY

BACKGROUND

Generally speaking, parallel processing helps ensure that processing requests that are received by a computing system are handled in as short a time period as possible when there are multiple servers or threads available. However, not all requests can be executed in parallel. There are times when data or resources have to be locked until a particular request has completed. During the execution of these locking requests that cannot be executed in parallel with other requests, any other or subsequent requests that are received must wait to execute until the execution of the locking request has completed. The longer the resources are locked by a locking request, the longer the wait times increase and the more system performance degrades.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for message handling related to non-parallelizable functionality.

Figure 1:
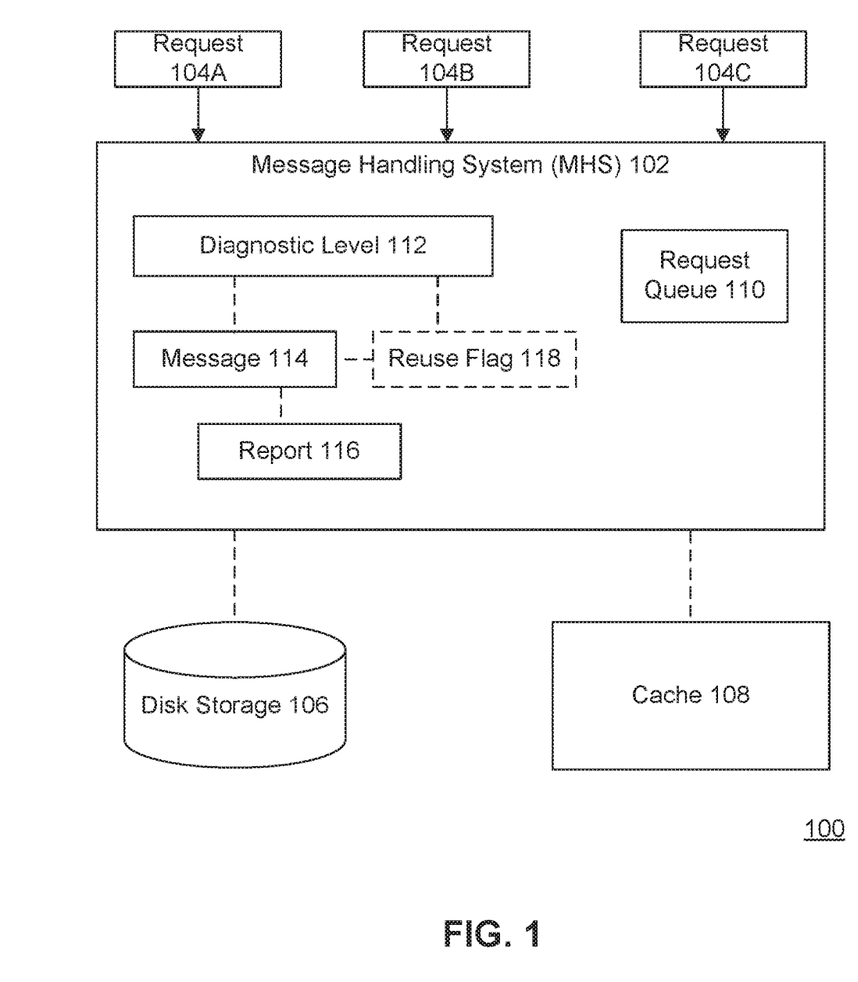
FIG. 1 is a block diagram illustrating examples of message handling related to non-parallelizable functionality, according to some embodiments.

FIG. 1 is a block diagram illustrating example message handling related to non-parallelizable functionality, according to some embodiments. A message handling system (MHS) 102 may receive requests 104A-C from clients to perform transaction processing. The transaction processing requests 104 may include data reads, writes, address lookups, or any other processing request.

In an embodiment, request 104 may be a request to access data from a database. The database may be row or column oriented database that is stored on a disk storage 106. Disk 106 may be a storage device that is accessible to one or more servers, or computers, including MHS 102. In an embodiment, MHS 102 and disk 106 may be part of the same database system, and may reside on a single or across multiple computing devices or servers.

In an embodiment, the functionality or processing of request 104 may leverage or rely on previously configured or compiled libraries. Some of these libraries may not perform operations in parallel or have some functionality which is not parallelizable. When these libraries are used, parallel execution which may be on going for the calling process may be halted or suspended. These non-parallelizable functions may lock up resources or otherwise block other threads from executing until the non-parallelizable functions have completed.

In an embodiment, access to disk 106 by other threads may be blocked while a particular request 104, or blocking portions thereof, is being processed by one or more threads. The blocking may include locking the data or the portion(s) of disk 106 being accessed by MHS 102, blocking access to the library, or preventing parallel executions related to the processing of request 104. Other threads or processes which require or seek access to the locked portions of disk 106 or to perform functionality related to the request 104 must wait until the previous thread has completed processing of the non-parallelizable functionality, or has otherwise unlocked the resources.

MHS 102 may be responsible for recording or tracking diagnostic or logging information about the handling or processing of requests 104. This may involve building localized diagnostic information pertaining to the processing of requests 104 that rely on third-party libraries (for processing). During such building, other threads may be blocked from executing. The longer the building or recording of diagnostic or logging information takes, the greater the delays or bottleneck for subsequently received or lower priory requests 104, and the lower the system performance.

In an embodiment, the accumulation or collection of diagnostic information about requests 104 may be retrieved and/or include information retrieved from disk 106 (in a non-parallelizable fashion). To reduce the delays or wait times of queued requests 104, MHS 102 may reuse portions of the diagnostic information retrieved (from disk 106) during the processing of previously received and processed requests 104, store that information in a cache 108, and reuse the information for subsequent requests 104. At least some of the subsequent requests 104 may use some of the same diagnostic data.

However, storing information related to the processing of a request 104 in cache 108 for reuse may consume significant resources (processing cycles, cache memory 108, etc.). As such, MHS 102 may evaluate and store the information retrieved from disk 106 in cache 108, that is determined to be reusable (or potentially reusable) based on a reuse flag 118.

Cache 108 may be a memory storage structure which enables faster access to stored information from MHS 102 relative to disk 106 accesses. In an embodiment, this reuse determination may be based in part on how expensive (in terms of computing resources consumed) a particular operation is, and whether or not the library has used the particular (disk) information in the past.

MHS 102 may receive processing requests 104 to access data from a database, disk 106, or one or more other storage devices or locations. MHS 102 may store requests 104 in a request queue 110. MHS 102 may store or order the requests 104 in queue 110 based on any priority scheme that may be applicable for a particular system. Example priority schemes may include FIFO (first-in, first-out), LIFO (last-in, first-out), or a priority determination and ordering based on an individual priority associated with each request 104. In another embodiment, MHS 102 may not have a request queue 110. For example, each request 104 may be handled by, or represent its own thread of execution. Accordingly in such examples, a single queue may not be needed.

In an embodiment, requests 104 may indicate a diagnostic level 112. Diagnostic level 112 may be an indicator as to how much or what type of logging or diagnostic information is to be collected about how a particular request 104 was processed. Example diagnostic or logging information may include an indication as to which device(s) were accessed in the processing of request 104, what portion(s) of device 106 or other storage were accessed, what function(s) were called, the results of those function(s) (whether they executed successfully or values that were output as a result), the source of request 104 (date, time, user or device identifier), to which device a result of the request 104 is to be (or was) sent (if different from the source), and a processing time.

As referenced above, the processing of at least portion(s) of a particular request 104 may not be executable in parallel by multiple threads or processes. An example may include the collection of diagnostic information from disk 106. As such, the collection of the diagnostic information may increase the processing overhead of a particular request 104, thereby increasing the wait time for any subsequent requests 104 from queue 110. As the wait time increases, system performance decreases and particular requests 104 may abort or time-out.

Since the processing of request 104 may rely on a third-party or external library and the functionality may not be editable, to minimize or reduce wait time, MHS 102 may enable reuse of portions of diagnostic information that is being collected about the processing. Particularly, for example, MHS 102 may enable reuse of data retrieved from disk 106. For example, if request 104A is received and processed, portions of the diagnostic information about the processing of request 104A may be reused with request 104B or 104C. Thus, rather than requiring subsequent disk 106 accesses for those reusable portions of information, MHS 102 may identify which data can be reused and store that data in cache 108, thus reducing processing overhead and wait times, increasing system performance, and consuming fewer processing or computing cycles.

Each diagnostic level 112 may include or generate one or more messages 114. A message 114 may be an indicator as to which information or which type of information about the processing of a particular request 104 is to be captured during the processing of the request 104. Certain requests 104 (based on their sensitivity, priority, requesting user or machine, or other factors) may require more diagnostic information (e.g., messages 114) to be collected about them.

The diagnostic information may then be assembled into a report 116 which may be stored for later access or provided to a developer or administrator. Then for example, when evaluating the operation of a particular system or trying to determine how or where a particular error occurred, report 116 may be used.

In an embodiment, as noted above, a reuse flag 118 may be used to determine which information retrieved from disk 106 may be stored for reuse (or potential reuse) in cache 108. Reuse flag 118 may indicate which message(s) 114 includes information that can be reused, can potentially be reused, or is unique to a particular request 104 and cannot be reused. Based on reuse flag 118, MHS 102 may determine which information from disk 106 (retrieved during the processing of a particular request 104, including the assembly of diagnostic information related thereto) to store in cache 108.

Reuse flag 118 may indicate which information can be reused or potentially reused with one or more subsequently received or queued requests 104. The reuse flag 118 may indicate that particular information retrieved from disk 106 and corresponding to a particular message 114 may be reusable with a subsequently received request 104 for which similar functionality is performed at the same diagnostic level 112. In an embodiment, the reuse flag 118 may indicate multiple diagnostic levels 112 for which a particular piece of retrieved information relative to a message 114 can be reused.

In an example embodiment, there may be three different diagnostic levels 112, that is levels 1-3, which may be ordered from least amount of diagnostic overhead to the greatest amount of diagnostic overhead. Level 1 may include two messages 114, neither of which is flagged as being reusable 118. In this example, any request 104 that indicates Level 1 diagnostic information 112 may be processed by disk access 106 without any subsequent storage of information or checking of cache 108 prior to disk 106 access. Cache 108 may not be checked prior to disk access 106 because it may be known ahead of time, based on reuse flag 118, that none of the information related to the processing or diagnostic information of the particular request 104 is reusable.

In this example embodiment, level 2 may include three messages 114, one of which is always reusable (as indicated by a first reuse flag 118 value), one which cannot be reused, and one which can potentially be reused (as indicated by a second reuse flag 118 value). Then, for example, for a request 104 that indicates level 2 diagnostics, disk access 106 may be required for the non-reuse message 114 (for which the reuse flag 118 is not set).

For the information that is always reusable information, only cache 108 access may be required. This may include, for example, a client name when it is known that all requests 104 use the same client name. For information that is potentially reusable, MHS 102 may check cache 108 prior to accessing disk 106. Potentially reusable flag 118 may indicate that either the information for the message 114 may already be stored in cache 108 (based on the processing of a previous request), and/or should be stored in cache 108 after retrieval of information from disk 106 (to be potentially reused with subsequent requests 104). For those messages 114 for which the cached information can be reused, additional disk access 106 is avoided and processing time and consumed resources are decreased.

In this example embodiment, level 3 may include ten messages 114, which may include a combination of always reusable, non-reusable, and potentially reusable messages. The more messages 114 that are reusable or potentially reusable, the greater the processing and time savings MHS 102 may employ through reuse and cache storage 108. It is noted that the example embodiment discussed above is provided solely for illustrative purposes; this disclosure is not limited to this example embodiment.

In another embodiment, MHS 102 may reduce processing time or resources consumed by turning off or reducing portions of the diagnostic information requested. For example, in an embodiment in which MHS 102 includes queue 110 that exceeds a particular length or wait time threshold, only a reduced set or a minimum amount of diagnostic information may be collected for particular requests 104. For example, even in the case where request 104 is associated with level 3 information, only level 2 information may be collected and provided in report 116 to reduce blocking or processing time. In an embodiment, when the wait time or length is less than a particular threshold, MHS 102 may resume processing requests 104 based on their requested diagnostic levels 112.

In other, non-queue embodiments, other factors may be used to determine when to turn off portions of the diagnostic information requested. In an embodiment, message 114 may include different types of messages 114, such as informational messages, processing messages, transmission messages, and error messages. To reduce processing time and achieve other efficiencies, MHS 102 may turn on/off different types of messages 114. For example, processing and informational messages may be turned off, while error messages may be turned on for report 116.

Figure 2:
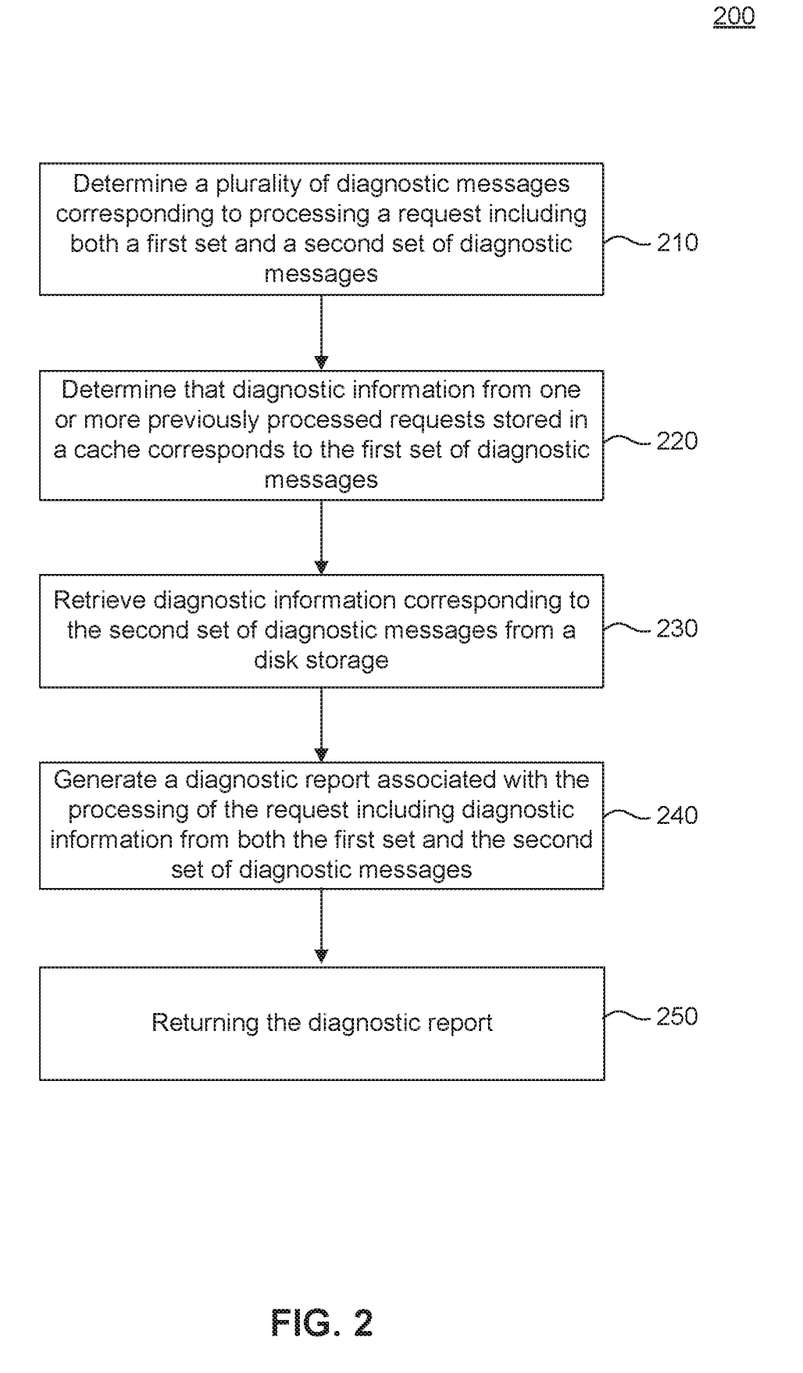
FIG. 2 is a flowchart illustrating a process for message handling related to non-parallelizable functionality, according to some embodiments.

FIG. 2 is a flowchart for a method 200 for message handling related to non-parallelizable functionality, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to that example embodiment.

In 210, a plurality of diagnostic messages corresponding to processing a request, including at least a first set and a second set of diagnostic messages, are determined. For example, MHS 102 may receive requests 104 which may be queued 110. MHS 102 may retrieve a highest priority request 104 from queue 110, and determine a diagnostic level 112 requested by or associated with the request 104. Diagnostic level 112 may indicate how much information or which diagnostic messages 114 are to be captured or recorded about processing of the particular request 104.

In an embodiment, messages 114 may be grouped based on reuse flag 118. Reuse flag 118 may indicate that a first group of messages 114 are not reusable. Based on this flag, MHS 102 may access disk storage 106 without first checking cache 108 when processing the associated request 104. Also, in this example scenario, MHS 102 may not store the retrieved information in cache 108 for potential reuse with subsequent requests 104 since flag 118 indicates the information is not reusable.

Reuse flag 118 may be set for a second group of messages 114 which may indicate that the information used in processing the message 114 is potentially reusable. In processing these messages 114, MHS 102 may check cache 108 prior to performing disk access to see if the information stored in cache 108 can be reused with the message 114 and request 104 that are currently being processed. If the information can be reused, then disk access to retrieve that information is avoided. If, however, the information cannot be reused or does not exist in cache, then disk 106 access is performed.

In 220, it is determined that diagnostic information, from one or more previously processed requests stored in a cache, corresponds to the first set of diagnostic messages. For example, for the group of messages 114 for which reuse flag 114 is set, some of that information may exist in cache 108 and may be used without performing disk access.

In an embodiment, the diagnostic information corresponding to messages 114 for each request 104 may be stored in either cache 108 or disk storage 106. Accessing disk storage 106 may require greater processing time or system resources than accessing cache 108, as such any information that may be retrieved from cache 108 rather than disk storage 106 would reduce the processing overhead associated with capturing the diagnostic information of a particular request 104.

In 230, diagnostic information corresponding to the second set of diagnostic messages is retrieved from the disk storage. For example, MHS 102 may retrieve from disk 106 any information that was not flagged 118 and/or could not be retrieved from cache 108. In an embodiment, after retrieving information from disk 106, MHS 118 may check reuse flag 118 to determine whether or not to store the retrieved information in cache 108, or to discard the information after use in generating report 116.

In 240, a diagnostic report associated with the processing of the request, including diagnostic information from both the first set and the second set of diagnostic messages, is generated. For example, MHS 102 may generate report 116 corresponding to the indicated diagnostic level 112 or request-type.

In 250, the diagnostic report is returned. For example, MHS 102 may store or make accessible a diagnostic report for the processed requests 104 (regardless of whether or not the request was processed successfully). Then for example, an administrator, developer, or other user may access the report to see the processing functionality and diagnostics performed during the processing of requests 104.

Figure 3:
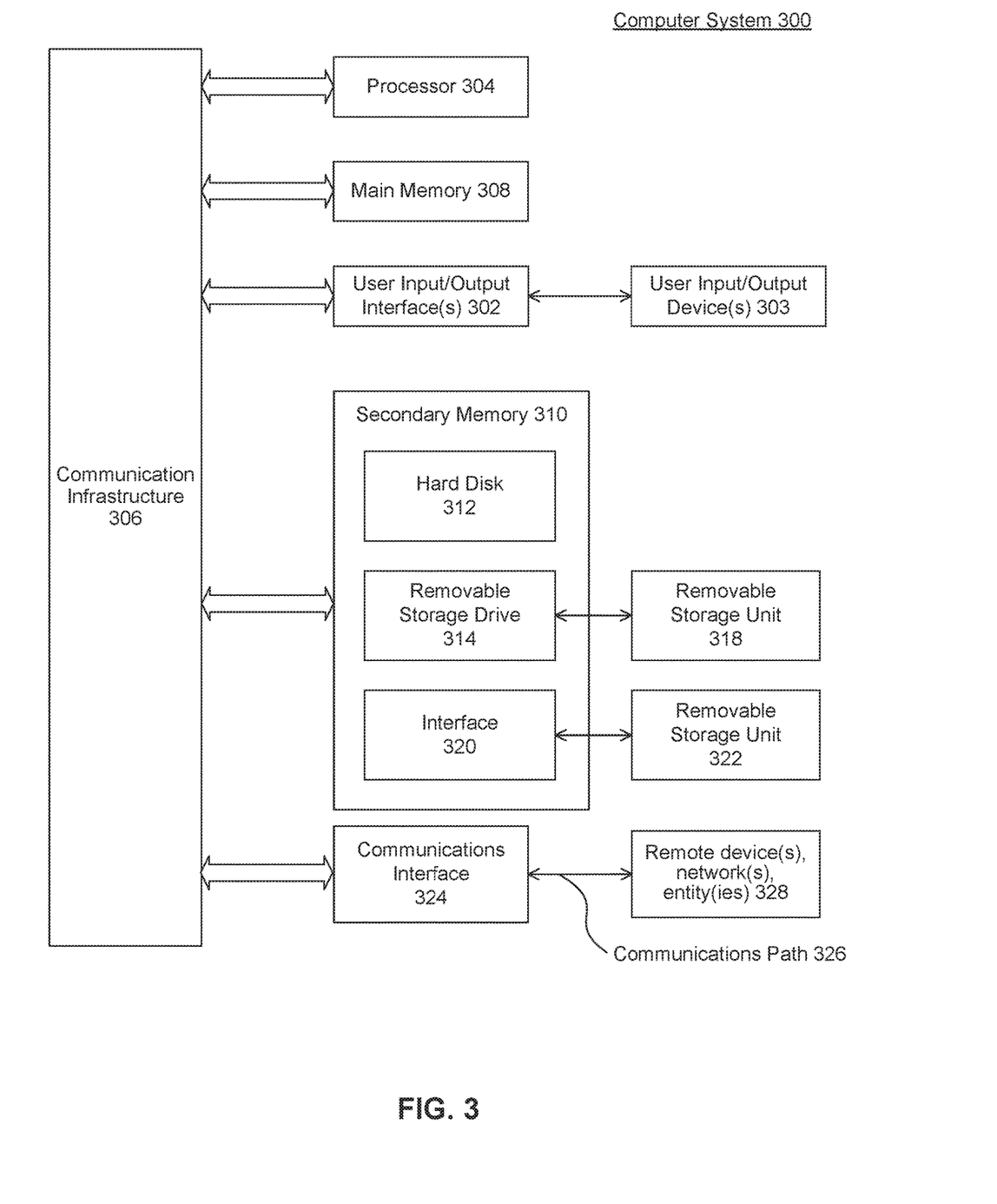
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising: determining a plurality of diagnostic messages corresponding to processing a request including both a first set and a second set of diagnostic messages, wherein the plurality of diagnostic messages correspond to information stored on a disk storage; determining that diagnostic information stored in a cache, from one or more previously processed requests, corresponds to the first set of diagnostic messages; retrieving the diagnostic information from the cache, thereby consuming fewer processing resources compared to retrieving diagnostic information from the disk storage, wherein the retrieving diagnostic information from the cache blocks processes from accessing the cache during the retrieving diagnostic information from the cache; retrieving diagnostic information corresponding to the second set of diagnostic messages from the disk storage, wherein the retrieving diagnostic information from the disk storage blocks processes from accessing the disk storage during the retrieving diagnostic information from the disk storage, and wherein fewer processes are blocked during the retrieving diagnostic information from the cache than are blocked during the retrieving diagnostic information from the disk storage; generating a diagnostic report associated with the processing of the request including diagnostic information from both the first set and the second set of diagnostic messages; and returning the diagnostic report.

2. The method of claim 1, wherein the plurality of diagnostic messages are associated with a particular diagnostic level of a plurality of diagnostic levels, wherein each diagnostic level corresponds to one or more diagnostic messages particular to the respective diagnostic level.

3. The method of claim 2, wherein the one or more previously processed requests are associated with the particular diagnostic level.

4. The method of claim 1, wherein the request comprises an address lookup request.

5. The method of claim 1, wherein the retrieving diagnostic information further comprises:
determining a first portion of retrieved diagnostic information to store in the cache based on a reuse flag, for reuse by subsequent requests; and
determining a second portion of retrieved diagnostic information not to store in the cache based on the reuse flag.

6. A system, comprising: a memory; and at least one processor coupled to the memory and configured to: determine a plurality of diagnostic messages corresponding to processing a request including both a first set and a second set of diagnostic messages, wherein the plurality of diagnostic messages correspond to information stored on a disk storage; determine that diagnostic information stored in a cache, from one or more previously processed requests, corresponds to the first set of diagnostic messages; retrieve the diagnostic information from the cache, thereby consuming fewer processing resources compared to retrieving diagnostic information from the disk storage, wherein the retrieving diagnostic information from the cache blocks processes from accessing the cache during the retrieving diagnostic information from the cache; retrieve diagnostic information corresponding to the second set of diagnostic messages from the disk storage, wherein the retrieving diagnostic information from the disk storage blocks processes from accessing the disk storage during the retrieving diagnostic information from the disk storage, and wherein fewer processes are blocked during the retrieving diagnostic information from the cache than are blocked during the retrieving diagnostic information from the disk storage; determine a first portion of retrieved diagnostic information to store in the cache based on a reuse flag, for reuse by subsequent requests; determine a second portion of retrieved diagnostic information not to store in the cache based on the reuse flag; generate a diagnostic report associated with the processing of the request including diagnostic information from both the first set and the second set of diagnostic messages; and return the diagnostic report.

7. The system of claim 6, wherein the plurality of diagnostic messages are associated with a particular diagnostic level of a plurality of diagnostic levels, wherein each diagnostic level corresponds to one or more diagnostic messages particular to the respective diagnostic level.

8. The system of claim 7, wherein the one or more previously processed requests are associated with the particular diagnostic level.

9. The system of claim 6, wherein the processor that determines that diagnostic information stored in the cache, from one or more previously processed requests, corresponds to the first set of diagnostic messages, is configured to:
retrieve the diagnostic information from the cache, thereby consuming fewer processing resources compared to retrieving diagnostic information from the disk storage.

10. The system of claim 9, wherein the retrieving diagnostic information blocks processes from accessing the cache or the disk storage during the retrieving, and wherein the blocking associated with the cache is less than the blocking associated with the disk storage.

11. The system of claim 6, wherein the request comprises an address lookup request.

12. A non-transitory computer-readable device having instructions stored thereon that, when executed by at least one computing device, causes the at least one computing device to perform operations comprising: determining a plurality of diagnostic messages corresponding to processing a request including both a first set and a second set of diagnostic messages, wherein the plurality of diagnostic messages correspond to information stored on a disk storage; determining that diagnostic information stored in a cache, from one or more previously processed requests, corresponds to the first set of diagnostic messages; retrieving the diagnostic information from the cache, thereby consuming fewer processing resources compared to retrieving diagnostic information from the disk storage, wherein the retrieving diagnostic information from the cache blocks processes from accessing the cache during the retrieving diagnostic information from the cache; retrieving diagnostic information corresponding to the second set of diagnostic messages from the disk storage, wherein the retrieving diagnostic information from the disk storage blocks processes from accessing the disk storage during the retrieving diagnostic information from the disk storage, and wherein fewer processes are blocked during the retrieving diagnostic information from the cache than are blocked during the retrieving diagnostic information from the disk storage; generating a diagnostic report associated with the processing of the request including diagnostic information from both the first set and the second set of diagnostic messages; and returning the diagnostic report.

13. The non-transitory computer-readable device of claim 12, wherein the plurality of diagnostic messages are associated with a particular diagnostic level of a plurality of diagnostic levels, wherein each diagnostic level corresponds to one or more diagnostic messages particular to the respective level.

14. The non-transitory computer-readable device of claim 13, wherein the one or more previously processed requests are associated with the particular diagnostic level.

15. The non-transitory computer-readable device of claim 12, wherein the determining that diagnostic information stored in the cache, from one or more previously processed requests, corresponds to the first set of diagnostic messages, comprises:

retrieving the diagnostic information from the cache, thereby consuming fewer processing resources compared to retrieving diagnostic information from the disk storage.

16. The non-transitory computer-readable device of claim 15, wherein the retrieving diagnostic information blocks processes from accessing the cache or the disk storage during the retrieving, and wherein the blocking associated with the cache is less than the blocking associated with the disk storage.

17. The non-transitory computer-readable device of claim 12, wherein the request comprises an address lookup request.

* * * * *